United States Patent Office 3,123,632
Patented Mar. 3, 1964

3,123,632
PROCESS FOR THE PRODUCTION OF THE AMMONIUM SALTS OF CARBOXYLIC ACIDS
Ewald Katzschmann, Dortmund-Kruckel, Germany, assignor to Chemische Werke Witten, Witten (Ruhr), Germany
No Drawing. Filed June 23, 1960, Ser. No. 38,094
Claims priority, application Germany June 27, 1959
6 Claims. (Cl. 260—475)

The present invention relates to a process for the production of the ammonium salts of carboxylic acids, and in particular, to the production of the ammonium salts of carboxylic acids from the carboxylic acids or from the esters of these acids.

The ammonium salts of organic carboxylic acids are particularly valuable, since it is possible to obtain therefrom the corresponding amides, nitriles, or other compounds which are suitable for many varied and diversified uses. In addition thereto, the ammonium salts in aqueous solution may be converted into the pure acids by treatment with mineral acids.

A known manner of producing the ammonium salts of carboxylic acids involves the production of such ammonium salts from aqueous solutions of the organic carboxylic acids. Particular difficulties exist in the production of the ammonium salts of organic carboxylic acids by this manner, however, since the organic acids are frequently of relatively low solubility in water. In such a case, it is necessary to react or convert very diluted (i.e., ballast-rich) acid solutions with ammonia. Several organic acids may be converted only by the use or application of a considerable excess of ammonia, or by the use of pressure, to form the corresponding ammonium salts.

Furthermore, the isolation of the ammonium salts of organic carboxylic acids from their aqueous solutions is very difficult, because these salts are highly soluble in water and crystallize only after partial or complete removal of the water.

It is known that dimethyl formamide is suitable as a solvent for organic substances, including the otherwise relatively insoluble organic acids, such as, for example, terephthalic acid, isophthalic acid, or aromatic tricarboxylic acids. The solubility of, for example, terephthalic acid in dimethyl formamide has been employed for the purification of the terephthalic acid, i.e., removal of adhering p-toluic acid. There is a distinct disadvantage in this method of purification, however, in that the terephthalic acid, dissolved in dimethyl formamide at boiling temperature, will re-crystallize when cooled to about 5° C. in only about half the amount. Isophthalic acid cannot be purified according to this method because its solubility in dimethyl formamide is too great.

The present invention is based upon the recognition that the ammonium salts of carboxylic acids can be obtained in almost quantitative yield, when the carboxylic acids are dissolved in dimethyl formamide and ammonia is introduced into the solution thereby obtained in the quantity which is stoichiometrically required.

The acids which may be used in the present process may, for example, be aliphatic mono- and di-carboxylic acids, such as myristic acid, adipic acid, or aromatic carboxylic acids, such as benzoic acid, o-phthalic acid, terephthalic acid, isophthalic acid, trimesic acid, or their semi- and, respectively, di-ester, so long as the compounds possess at least one free carboxylic group. The above-named acids can be formulated as $RCOOH$, $R(COOH)_2$

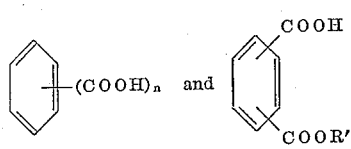

wherein R is an unsubstituted aliphatic radical, R' is a lower alkyl radical and $n$ is an integer from 1 to 3.

It is also possible to use as starting materials in the present process the esters of di-carboxylic acids or poly-carboxylic acids having at least one free carboxylic group and to produce their mono- and, respectively, their mono- or poly-ammonium salts, when the afore-mentioned compounds are reacted with stoichiometric quantities of ammonia.

The ammonium salts obtained from the carboxylic acids are crystalline substances which may be separated from the dimethyl formamide solution by decanting, centrifuging, suction, or filtration, whereby the filtrate represents practically pure dimethyl formamide. By distillation of such a filtrate, it has been found that the distillation residue is less than 0.5%, referred to the weight of the filtrate. The filtrate may, thus, be directly returned to the process.

The ammonium salts obtained according to the present invention following separation from the filtrate have not more than 3–5% dimethyl formamide adhering thereto after centrifuging. The adhering dimethyl formamide may be removed by washing of the ammonium salts with a suitable solvent.

The process according to the present invention may be carried out either in a batch or in a continuous process. It is also possible to use pressure.

It is an object of the present invention to provide an improved and simplified method for the production of the ammonium salts of carboxylic acids.

It is a further object of the present invention to provide a method for the production of the ammonium salts of carboxylic acids from solutions of carboxylic acids or carboxylic acid esters having at least one free carboxylic group.

The ammonium salts produced according to the present invention are suitable for diversified further treatment or processing and may be used without further preparation or working-up, for example, directly for esterification. Particularly in the case of ammonium salts of tere- or isophthalic acid, the products according to the present invention may be utilized directly for poly-condensation.

Examples illustrating the process without limiting the same are as follows:

*Example 1*

50 g. of myristic acid are dissolved at room temperature in 450 g. of dimethyl formamide. While this solution is stirred, 4 g. of ammonia are introduced at a velocity of 0.3 liter per minute. A white, finely crystalline deposit is formed which is drawn off by suction, washed with ether and dried. The yield is 48 g. ammonium salt, which is equal to 89.3% of the theoretical value, having a nitrogen content of 5.5%, calculated to be 5.7%.

Example II 100 g. of adipic acid are dissolved at room temperature in 400 g. of dimethyl formamide. While the solution is stirred, 25 g. of ammonia are introduced at 22° C. and at a velocity of 0.5 liter per minute. Due to the reaction heat, the temperature rises to 90° C. within 15 minutes. After cooling to room temperature, a well crystallized deposit is drawn off by suction. The adhering dimethyl formamide is distilled off in vacuo. The yield of ammonium salt amounts to 119 g., which is equal to 97% of the theoretical value, with the following characterizing numbers:

|  | Experimental | Calculated |
| --- | --- | --- |
| Saponification number | 626 | 625 |
| $N_2$ percent | 15.3 | 15.5 |

Example III 50 g. of benzoic acid are dissolved in 200 g. of dimethyl formamide. A faint turbidity occurs, which does not disappear during heating and which is removed by filtration. 8 g. of ammonia are then introduced at approximately 30° C. while the solution is stirred. After about 3 minutes, a faint turbidity forms which progressively increases. The temperature also rises to 52° C. The well crystallized deposit formed is drawn off by suction, washed with ether and dried. 53 g. of ammonium salt are obtained, which is 93% of the theoretical value, with the following characterizing numbers:

|  | Experimental | Calculated |
| --- | --- | --- |
| Saponification number | 405 | 404 |
| $N_2$ percent | 9.8 | 10.1 |

Example IV 50 g. of terephthalic acid are dissolved in 500 g. of dimethyl formamide while heating to 110° C. Subsequently, while the solution is stirred, 12 g. of ammonia are introduced. A deposit is formed which is drawn off by suction, washed with ether and dried. The yield is 58 g. of ammonium salt, which is equal to 98.6% of the theoretical value, with a nitrogen content of 13.8%, as compared to 14% calculated nitrogen content.

Example V 40 g. of isophthalic acid are dissolved in 250 g. of dimethyl formamide. 4 g. of ammonia are added to the solution at room temperature while the solution is stirred. A deposit is formed which is drawn off by suction, washed with ether and dried. 35.5 g. of mono-ammonium salt are obtained, 80% of the theoretical amount, with the following characterizing numbers:

|  | Experimental | Calculated |
| --- | --- | --- |
| Saponification number | 610 | 612 |
| $N_2$ percent | 7.4 | 7.65 |

Example VI 120 g. of terephthalic acid monomethyl ester are dissolved in 500 g. of dimethyl formamide at room temperature. While stirring well, ammonia is introduced which is completely absorbed. As soon as the reaction mixture has assumed a distinct ammonia odor, the reaction is completed. The weight increase amounts to 11.5 g. The well crystallized deposit formed is drawn off by suction and washed with ether. After drying, 129.6 g. of ammonium salt, 98.4% of the theoretical amount, is weighed out. The wash ether is distilled off, the residue is combined with the filtrate, and the dimethyl formamide then distilled off. There is a residue of 1.5 g., representing pure ammonium salt. The characterizing numbers of the ammonium salts of terephthalic acid mono-methyl ester are

|  | Experimental | Calculated |
| --- | --- | --- |
| Saponification number | 569 | 569 |
| $N_2$ percent | 7 | 7.1 |

Example VII 25 g. of trimesic acid (1,3,5-benzoic-tricarboxylic acid) are dissolved in 300 g. of dimethyl formamide at room temperature. Ammonia is introduced into the solution, while stirring well, for a period of time until the solution has a definite ammonia odor. The temperature rises to 42° C. The crystalline deposit formed is drawn off by suction, washed with 100 g. of dimethyl formamide, washed with ether, and dried. 30.2 g., 96.8% of the theoretical amount, of ammonium salt are obtained.

Of course, many changes and variations in composition of the starting materials, in the reaction conditions, temperatures, duration, the manner of working up the reaction mixture, and of isolating and purifying the resulting products and the like, may be made by those skilled in the art in accordance with the principles set forth hereinabove, and I, therefore, do not wish to be limited to the details and specific examples described herein only for illustrative purposes, but intend to cover all such changes and modifications as are encompassed by the scope of the appended claims.

I claim:

1. A process for the production of pure ammonium salts of carboxylic acids in a substantially quantitative yield comprising forming a solution in dimethyl formamide of an acid compound selected from the group consisting of the carboxylic acids and acid esters represented by RCOOH, R(COOH)$_2$,

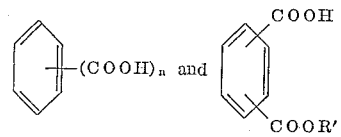

wherein R is an unsubstituted aliphatic radical, R' is a lower alkyl radical and $n$ is an integer from 1 to 3, introducing ammonia into said solution until the solution has a distinct odor of ammonia, and thereafter separating from said solution the crystalline ammonium salts of said compound formed in said solution by the introduction of the ammonia.

2. A process as defined in claim 1, wherein said acid compound is adipic acid.

3. A process as defined in claim 1, wherein said acid compound is benzoic acid.

4. A process as defined in claim 1, wherein said acid compound is terephthalic acid.

5. A process as defined in claim 1, wherein said acid compound is isophthalic acid.

6. A process as defined in claim 1, wherein said acid compound is terephthalic acid monomethyl ester.

References Cited in the file of this patent

UNITED STATES PATENTS 2,811,548   Ham et al.   Oct. 29, 1957

FOREIGN PATENTS 788,276   Great Britain   Dec. 23, 1957
818,211   Great Britain   Aug. 12, 1959